US012037509B2

(12) United States Patent
Katayama

(10) Patent No.: US 12,037,509 B2
(45) Date of Patent: Jul. 16, 2024

(54) PRIMER COMPOSITION FOR BONDING SILICONE RESIN AND POLYOLEFIN RESIN, AND METHOD FOR BONDING SILICONE RESIN AND POLYOLEFIN RESIN

(71) Applicant: Shin-Etsu Chemical Co., Ltd., Tokyo (JP)

(72) Inventor: Taiki Katayama, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 650 days.

(21) Appl. No.: 17/269,133

(22) PCT Filed: Aug. 21, 2019

(86) PCT No.: PCT/JP2019/032533
§ 371 (c)(1),
(2) Date: Feb. 17, 2021

(87) PCT Pub. No.: WO2020/054335
PCT Pub. Date: Mar. 19, 2020

(65) Prior Publication Data
US 2021/0324224 A1 Oct. 21, 2021

(30) Foreign Application Priority Data
Sep. 11, 2018 (JP) ................. 2018-169840

(51) Int. Cl.
*C09D 143/04* (2006.01)
*C09D 5/00* (2006.01)
*C09D 7/20* (2018.01)

(52) U.S. Cl.
CPC ........... *C09D 143/04* (2013.01); *C09D 5/002* (2013.01); *C09D 7/20* (2018.01)

(58) Field of Classification Search
CPC ......... C09D 143/04; C09D 7/20; C09D 5/002
See application file for complete search history.

(56) References Cited

U.S. PATENT DOCUMENTS

| | | |
|---|---|---|
| 2004/0138356 A1 | 7/2004 | Miyata et al. |
| 2008/0262158 A1 | 10/2008 | Morita et al. |
| 2011/0071266 A1 | 3/2011 | Morita et al. |
| 2014/0203323 A1 | 7/2014 | Ozai |
| 2018/0361721 A1 | 12/2018 | Hirokami |

FOREIGN PATENT DOCUMENTS

| | | | |
|---|---|---|---|
| CN | 101792632 A | * | 8/2010 |
| CN | 101792632 A | | 8/2010 |
| JP | 2001-240750 A | | 9/2001 |
| JP | 2003-313332 A | | 11/2003 |
| JP | 2004-210894 A | | 7/2004 |
| JP | 2006-63092 A | | 3/2006 |
| JP | 2010-168496 A | | 8/2010 |
| JP | 2014-157849 A | | 8/2014 |
| JP | 2019-112580 A | | 7/2019 |
| KR | 10-1717782 B1 | | 3/2017 |
| WO | WO 2017/119181 A1 | | 7/2017 |

OTHER PUBLICATIONS

Machine-generated English-language translation of CN-101792632-A.*
Office Action issued May 18, 2022, in corresponding Chinese Patent Application No. 201980059032.X (with English Translation), 14 pages.
Extended European Search Report issued on May 9, 2022 in European Patent Application No. 19861016.4, 7 pages.
Chinese Office Action issued Aug. 17, 2022 in Chinese Patent Application No. 201980059032.X (with English language translation), 13 pages.
International Search Report issued Oct. 8, 2019 in PCT/JP2019/032533 filed Aug. 21, 2019, 2 pages.
Combined Chinese Office Action and Search Report Issued Oct. 25, 2021 in Chinese Patent Application No. 201980059032.X (with English translation), 22 pages.
Office Action issued Mar. 15, 2022, in corresponding Japanese Patent Application No. 2020-546798 (with English Translation), 10 pages.

* cited by examiner

*Primary Examiner* — Vu A Nguyen
(74) *Attorney, Agent, or Firm* — Oblon, McClelland, Maier & Neustadt, L.L.P.

(57) ABSTRACT

Provided is a primer composition capable of imparting a favorable adhesiveness when bonding a polyolefin resin and a silicone resin such as a cured product (silicone rubber cured product) of a silicone rubber composition selected from a room temperature condensation-curable silicone rubber composition and an addition-curable silicone rubber composition. The primer composition for bonding a silicone resin and a polyolefin resin comprises a copolymer (I) contained in a solvent (II), in which the copolymer (I) at least contains a (meth)acrylate ester monomer unit (A) and a (meth)acrylate ester monomer unit (B).

7 Claims, No Drawings

PRIMER COMPOSITION FOR BONDING SILICONE RESIN AND POLYOLEFIN RESIN, AND METHOD FOR BONDING SILICONE RESIN AND POLYOLEFIN RESIN

TECHNICAL FIELD

The present invention relates to a primer composition for bonding a silicone resin and a polyolefin resin, particularly a primer composition for boding a polyolefin resin and a silicone resin such as a cured product (silicone rubber cured product) of a silicone rubber composition selected from a room temperature condensation-curable silicone rubber composition and an addition-curable silicone rubber composition; and a method for bonding a silicone resin and a polyolefin resin, using such primer composition.

BACKGROUND ART

Polyolefin resins such as polypropylene and polyethylene are widely used in various fields as they are general thermoplastic resins and inexpensive, and have a variety of superior properties such as mechanical properties, moldabilities, chemical resistances and electric properties. However, polyolefin resins are known as low adhesive materials as they have low polarity due to the absence of polar groups in the polymers, and are crystalline. In general, in order to achieve an adhesiveness to a polyolefin resin, there are known various methods such as a method for chemically treating a surface with a chemical agent or the like; or a method for oxidatively treating a surface by means of, for example, plasma treatment. However, these methods require specialized equipments. Further, as a simpler method, there is known a method for applying a chlorinated polyolefin or an acid modified chlorinated polyolefin as a primer; when bonding a silicone sealant (silicone resin) and a polyolefin resin, adhesiveness is usually achieved by treating a surface with a primer comprised of a chlorinated polyolefin or an acid modified chlorinated polyolefin.

Here, as a prior art to the present invention, there is known, for example, JP-A-2004-210894 (Patent document 1).

PRIOR ART DOCUMENTS

Patent Document

Patent document 1: JP-A-2004-210894

SUMMARY OF THE INVENTION

Problems to be Solved by the Invention

Conventional primer compositions have exhibited an insufficient adhesiveness with respect to silicone resins and polyolefin resins; it has been a challenge to improve the adhesiveness of a primer composition.

The present invention was made in view of the above issues, and it is an object of the present invention to provide a primer composition capable of imparting a favorable adhesiveness when bonding a polyolefin resin and a silicone resin, particularly a silicone resin such as a cured product (silicone rubber cured product) of a silicone rubber composition selected from a room temperature condensation-curable silicone rubber composition and an addition-curable silicone rubber composition.

Means to Solve the Problems

The inventors of the present invention diligently conducted a series of studies to achieve the above object, and completed the invention as follows. Specifically, the inventors found that a particular primer composition was capable of imparting a favorable adhesiveness when using a polyolefin resin as a base material, such primer composition being a composition comprised of a copolymer containing a (meth)acrylate ester monomer unit having a monovalent hydrocarbon group having 1 to 12 carbon atoms, such as an alkyl group; and a (meth)acrylate ester monomer unit having a hydrosilyl group(s) (SiH groups) as functional groups capable of bonding to a silicone resin such as a cured product (silicone rubber) of a condensation-curable or addition-curable silicone rubber composition.

That is, the present invention is to provide the following primer composition for bonding a silicone resin and a polyolefin resin; and the following method for bonding a silicone resin and a polyolefin resin.

[1]

A primer composition for bonding a silicone resin and a polyolefin resin, comprising a copolymer (I) contained in a solvent (II), the copolymer (I) at least containing:

a (meth)acrylate ester monomer unit (A) represented by the following general formula (1)

wherein $R^1$ represents a hydrogen atom or a methyl group, $R^2$ represents a substituted or unsubstituted monovalent hydrocarbon group having 1 to 12 carbon atoms; and a (meth)acrylate ester monomer unit (B) represented by the following general formula (2)

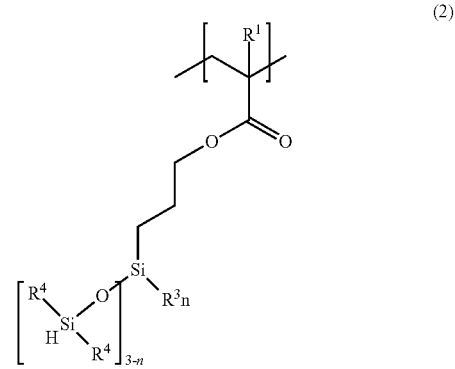

wherein $R^1$ represents a hydrogen atom or a methyl group, $R^3$ represents a hydrogen atom, or a substituted or unsubstituted monovalent hydrocarbon group having 1 to 12 carbon atoms, $R^4$ independently represents a substituted or unsubstituted monovalent hydrocarbon group having 1 to 12 carbon atoms, n represents an integer satisfying $0 \leq n \leq 2$.

[2]

The primer composition for bonding a silicone resin and a polyolefin resin according to [1], wherein $R^2$ in the (meth)acrylate ester monomer unit (A) of the component (I) represents a tert-butyl group or a cyclohexyl group.

[3]

The primer composition for bonding a silicone resin and a polyolefin resin according to [1] or [2], wherein a ratio of (meth)acrylate ester monomer unit (A): (meth)acrylate ester monomer unit (B) in the copolymer (I) is 1:1 to 1,000:1 (molar ratio).

[4]

The primer composition for bonding a silicone resin and a polyolefin resin according to any one of [1] to [3], wherein the component (I) is contained in an amount of 0.1 to 20 parts by mass per 100 parts by mass of the component (II).

[5]

The primer composition for bonding a silicone resin and a polyolefin resin according to any one of [1] to [4], wherein the component (II) is a mixture of one or more solvents selected from an aromatic hydrocarbon solvent, an alcohol solvent, a ketone solvent, an ether solvent, an ester solvent and a paraffin solvent.

[6]

The primer composition for bonding a silicone resin and a polyolefin resin according to any one of [1] to [5], wherein the primer composition is for bonding a cured product of a room temperature condensation-curable silicone rubber composition or an addition-curable silicone rubber composition to a base material made of a polyolefin resin.

[7]

The primer composition for bonding a silicone resin and a polyolefin resin according to any one of [1] to [6], wherein a molecular weight of the copolymer (I) is 3,000 to 200,000.

[8]

The primer composition for bonding a silicone resin and a polyolefin resin according to any one of [1] to [7], wherein the copolymer (I) only contains, as monomer units, the (meth)acrylate ester monomer unit (A) and the (meth) acrylate ester monomer unit (B).

[9]

A method for bonding a silicone resin and a polyolefin resin, comprising:
 a step of applying the composition according to any one of [1] to [8] to the surface of a base material made of a polyolefin resin to form a primer composition layer thereon;
 a step of applying to an outer surface of the primer composition layer a silicone rubber composition selected from a room temperature condensation-curable silicone rubber composition and an addition-curable silicone rubber composition to form a silicone rubber composition layer; and
 a step of curing the silicone rubber composition layer to form a silicone resin layer comprised of a silicone rubber cured product.

Effects of the Invention

The primer composition of the present invention is capable of favorably bonding a silicone resin such as a cured product (silicone rubber cured product) of a silicone resin composition selected from a room temperature condensation-curable silicone rubber composition and an addition-curable silicone rubber composition, particularly a cured product (addition-curable silicone rubber cured product) such as that of an addition-curable silicone rubber composition that is cross-linkable and curable by hydrosilylation addition reaction to a polyolefin resin, particularly to polypropylene.

MODE FOR CARRYING OUT THE INVENTION

The present invention is described in detail hereunder. However, the present invention is not limited to the following examples.

Primer Composition

A primer composition of the present invention for bonding a silicone resin and a polyolefin resin, contains:
 Component (I): Later-described particular (meth)acryl copolymer; and
 Component (II): Later-described particular solvent (I) (meth)acryl Copolymer A copolymer (I) used in the present invention at least contains a (meth)acrylate ester monomer unit (A) represented by the following general formula (1); and a hydrosilyl group-containing (meth)acrylate ester monomer unit (B) represented by the following general formula (2) (i.e. a hydrosilyl group is an SiH group defined as a silicon atom-bonded hydrogen atom).

[Chemical formula 3]

(1)

(In this formula, $R^1$ represents a hydrogen atom or a methyl group; $R^2$ represents a substituted or unsubstituted monovalent hydrocarbon group having 1 to 12 carbon atoms.)

[Chemical formula 4]

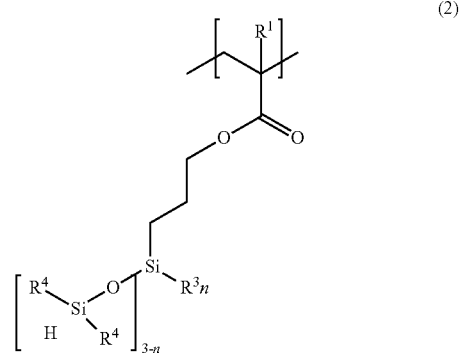

(2)

(In this formula, $R^1$ represents a hydrogen atom or a methyl group; $R^3$ represents a hydrogen atom, or a substituted or unsubstituted monovalent hydrocarbon group having 1 to 12 carbon atoms; $R^4$ independently represents a substituted or unsubstituted monovalent hydrocarbon group having 1 to 12 carbon atoms; n represents an integer satisfying $0 \leq n \leq 2$.)

Here, in the general formula (1) of the above monomer unit (A), examples of $R^2$ which is a substituted or unsubstituted monovalent hydrocarbon group having 1 to 12 carbon atoms include alkyl groups such as a methyl group, an ethyl group, a propyl group, an isopropyl group, a butyl group, an isobutyl group, a sec-butyl group, a tert-butyl group, a pentyl group, a hexyl group, a heptyl group, an octyl group, a nonyl group, a decyl group and a dodecyl group; cycloalkyl groups such as a cyclopentyl group and a cyclohexyl group; alkenyl groups such as a vinyl group, an allyl group, a butenyl group, a pentenyl group and a hexenyl group; aryl groups such as a phenyl group, a tolyl group, a xylyl group and an α-, β-naphthyl group; aralkyl groups such as a benzyl group, a 2-phenylethyl group and a 3-phenylpropyl group; or groups obtained by substituting part of or all the hydrogen atoms in any of these groups with, for example, a cyano group or halogen atoms such as F, Cl and Br, examples of which include a 3-chloropropyl group, a 3,3,3-trifluoropropyl group and a 2-cyanoethyl group. Among the above groups, preferred are alkyl or cycloalkyl groups having 4 to 6 carbon atoms, such as alkyl groups including a butyl group, an isobutyl group, a sec-butyl group, a tert-butyl group or the like; and a cyclohexyl group. Particularly preferred are a tert-butyl group and a cyclohexyl group. Thus, it is preferred that the (meth)acrylate ester monomer unit (A) be a (meth)acrylate alkyl ester monomer unit or a (meth)acrylate cycloalkyl ester monomer unit.

Further, in the general formula (2) of the above monomer unit (B), $R^3$ represents a hydrogen atom, or a substituted or unsubstituted monovalent hydrocarbon group having 1 to 12 carbon atoms. It is preferred that $R^3$ be a substituted or unsubstituted monovalent hydrocarbon group having 1 to 12 carbon atoms, and examples of such substituted or unsubstituted monovalent hydrocarbon group having 1 to 12 carbon atoms include alkyl groups such as a methyl group, an ethyl group, a propyl group, an isopropyl group, a butyl group, an isobutyl group, a sec-butyl group, a tert-butyl group, a pentyl group, a hexyl group, a heptyl group, an octyl group, a nonyl group, a decyl group and a dodecyl group; cycloalkyl groups such as a cyclopentyl group and a cyclohexyl group; alkenyl groups such as a vinyl group, an allyl group, a butenyl group, a pentenyl group and a hexenyl group; aryl groups such as a phenyl group, a tolyl group, a xylyl group and an α-, β-naphthyl group; aralkyl groups such as a benzyl group, a 2-phenylethyl group and a 3-phenylpropyl group; or groups obtained by substituting part of or all the hydrogen atoms in any of these groups with, for example, a cyano group or halogen atoms such as F, Cl and Br, examples of which include a 3-chloropropyl group, a 3,3,3-trifluoropropyl group and a 2-cyanoethyl group. Among the above groups, alkyl groups such as a methyl group and an ethyl group are preferred; a methyl group is particularly preferred.

Further, in the general formula (2), $R^4$ independently represents a substituted or unsubstituted monovalent hydrocarbon group having 1 to 12 carbon atoms, examples of which include alkyl groups such as a methyl group, an ethyl group, a propyl group, an isopropyl group, a butyl group, an isobutyl group, a sec-butyl group, a tert-butyl group, a pentyl group, a hexyl group, a heptyl group, an octyl group, a nonyl group, a decyl group and a dodecyl group; cycloalkyl groups such as a cyclopentyl group and a cyclohexyl group; alkenyl groups such as a vinyl group, an allyl group, a butenyl group, a pentenyl group and a hexenyl group; aryl groups such as a phenyl group, a tolyl group, a xylyl group and an α-, β-naphthyl group; aralkyl groups such as a benzyl group, a 2-phenylethyl group and a 3-phenylpropyl group; or groups obtained by substituting part of or all the hydrogen atoms in any of these groups with, for example, a cyano group or halogen atoms such as F, Cl and Br, examples of which include a 3-chloropropyl group, a 3,3,3-trifluoropropyl group and a 2-cyanoethyl group. Among the above groups, preferred are alkyl groups such as a methyl group and an ethyl group; and aryl groups such as a phenyl group. Particularly preferred are a methyl group and a phenyl group.

Here, n is an integer satisfying 0≤n≤2 (i.e. 0, 1 or 2), preferably 0 or 1, particularly preferably 0.

It is desired that a molecular weight of the copolymer (I) normally be, for example, 3,000 to 200,000, preferably 5,000 to 100,000, more preferably 10,000 to 80,000. Here, the molecular weight (or polymerization degree) can usually be measured as, for example, a number average molecular weight (or number average polymerization degree) in terms of polystyrene in a gel permeation chromatography (GPC) analysis using tetrahydrofuran (THF) or the like as a developing solvent.

There, it is preferred that a ratio of (meth)acrylate ester monomer unit (A): (meth)acrylate ester monomer unit (B) (simply referred to as a ratio of (A): (B) hereunder) be 1:1 to 1,000:1 (molar ratio), more preferably 2:1 to 500:1, particularly preferably 4:1 to 200:1, even more particularly preferably 6:1 to 100:1.

In the copolymer (I), there are no particular restrictions on a sequence of the (meth)acrylate ester monomer unit (A) and the (meth)acrylate ester monomer unit (B); while this sequence can be any of, for example, a random, alternate or block sequence, the copolymer (I) is usually a random copolymer of the (meth)acrylate ester monomer unit (A) and the (meth)acrylate ester monomer unit (B), which is produced by radical polymerization.

It is preferred that the component (I) be contained in the primer composition of the present invention by an amount of 0.1 to 20 parts by mass, more preferably 0.5 to 15 parts by mass, particularly preferably 1 to 10 parts by mass, even more particularly preferably 3 to 7.5 parts by mass, per 100 parts by mass of the component (II).

Further, the copolymer (I) can be prepared by subjecting a (meth)acrylate ester monomer (A) and a hydrosilyl group (SiH group)-containing (meth)acrylate ester monomer (B) to radical polymerization, where the (meth)acrylate ester monomer (A) is a precursor of the (meth)acrylate ester monomer unit (A) and is represented by the following general formula (3), and the (meth)acrylate ester monomer (B) is a precursor of the (meth)acrylate ester monomer unit (B) and is represented by the following general formula (4). Specifically, the (meth)acrylate ester monomer (A) represented by the general formula (3) and the (meth)acrylate ester monomer (B) represented by the general formula (4) are to be added into an organic solvent (preferably a solvent identical to the later-descried solvent (II)) at the above molar ratio, followed by further adding a polymerization initiator thereinto and then performing heating and stirring at 50 to 200° C., thereby obtaining the (meth)acryl copolymer (I) which is preferably in a state of being dissolved in the solvent identical to the solvent (II).

[Chemical formula 5]

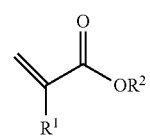

(3)

(In this formula, $R^1$ and $R^2$ are defined as above.)

[Chemical formula 6]

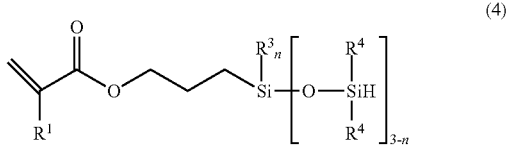

(4)

(In this formula, R', $R^3$, $R^4$ and n are defined as above.)

Specific examples of the (meth)acrylate ester monomer represented by the general formula (3) include butyl methacrylate, isobutyl methacrylate, sec-butyl methacrylate, tert-butyl methacrylate, cyclohexyl methacrylate, butyl acrylate, isobutyl acrylate, sec-butyl acrylate, tert-butyl acrylate and cyclohexyl acrylate. Among these monomers, one of them may be used alone, or two or more of them may be used in combination.

Preferable examples of the hydrosilyl group (SiH group)-containing (meth)acrylate ester monomer represented by the general formula (4) include

- [3-[tris(diorganohydrogensiloxy)silyl]propyl] acrylate,
- [3-[tris(diorganohydrogensiloxy)silyl]propyl] methacrylate,
- [3-[bis(diorganohydrogensiloxy)silyl]organo)propyl] acrylate and
- [3-[bis(diorganohydrogensiloxy)(organo)silyl]propyl] methacrylate.

Specific examples of the hydrosilyl group (SiH group)-containing (meth)acrylate ester monomer represented by the general formula (4) include

- [3-[tris(dimethylhydrogensiloxy)silyl]propyl] acrylate,
- [3-[tris(diethylhydrogensiloxy)silyl]propyl] acrylate,
- [3-[tris(diphenylhydrogensiloxy)silyl]propyl] acrylate,
- [3-[tris(dimethylhydrogensiloxy)silyl]propyl] methacrylate,
- [3-[tris(diethylhydrogensiloxy)silyl]propyl] methacrylate,
- [3-[tris(diphenylhydrogensiloxy)silyl]propyl] methacrylate,
- [3-[bis(dimethylhydrogensiloxy)silyl](methyl)propyl] acrylate,
- [3-[bis(diethylhydrogensiloxy)silyl](methyl)propyl] acrylate,
- [3-[bis(diphenylhydrogensiloxy)silyl](methyl)propyl] acrylate,
- [3-[bis(dimethylhydrogensiloxy)silyl](methyl)propyl] methacrylate,
- [3-[bis(diethylhydrogensiloxy)silyl](methyl)propyl] methacrylate,
- [3-bis(diphenylhydrogensiloxy)silyl(methyl)propyl] methacrylate,
- [3-[bis(dimethylhydrogensiloxy)silyl](ethyl)propyl] acrylate and
- [3-[bis(dimethylhydrogensiloxy)silyl](ethyl)propyl] methacrylate. Among these monomers, one of them may be used alone, or two or more of them may be used in combination.

Further, as a polymerization initiator, there may be used, for example, an organic peroxide such as di-tert-butylperoxide; or an azo compound such as 2,2'-azobis(2-methylbutyronitrile) and 2,2'-azobis(isobutyronitrile). The polymerization initiator is preferably added in an amount of 0.1 to 5.0 parts by mass per 100 parts by mass of all the monomers.

Here, although a (meth)acrylate ester(s) other than the monomers represented by the general formulae (3) and (4) may be added to the copolymer (I) in addition to these monomers without impairing the purpose of the present invention, it is preferred that the copolymer (I) only contain, as monomer units, the (meth)acrylate ester monomer unit (A) represented by the general formula (1) and the (meth) acrylate ester monomer unit (B) represented by the general formula (2).

(II) Solvent

The component (II) in the primer composition of the present invention may be that capable of dissolving each component in the primer composition at any ratio and having volatility. Specific examples of the component (II) include aromatic hydrocarbon solvents such as benzene, toluene and xylene; alcohol solvents such as methanol, ethanol, isopropyl alcohol, ethylene glycol monomethylether; ketone solvents such as acetone, methyl ethyl ketone and methyl isobutyl ketone; ester solvents such as ligroin, ethyl acetate, butyl acetate and isopropyl acetate; ether solvents such as tetrahydrofuran and dioxane; and paraffin solvents such as hexane, cyclohexane, methylcyclohexane and ethylcyclohexane. Any one of these solvents may be used alone, or two or more of them may be combined and used as a mixed solvent. Among these solvents, aromatic hydrocarbon solvents or ester solvents are preferred; particularly preferred are ethylcyclohexane, ethyl acetate, isopropyl acetate and butyl acetate.

Other Components

Further, other than the abovementioned components, as an optional component(s), one or more of, for example, various alkoxysilanes and/or their partial hydrolytic condensates, silane coupling agents and metal alkoxides may be added to the primer composition of the present invention if necessary, without impairing the purpose of the present invention.

Examples of these alkoxysilanes or silane coupling agents may include alkoxysilanes such as tetraethoxysilane, tetramethoxysilane, ethylsilicate and methylsilicate or partial hydrolytic condensates thereof; and silane coupling agents (carbon functional group-containing hydrolyzable silanes) including, for example, alkenyl functional group-containing alkoxysilanes such as vinyltrimethoxysilane, vinyltriethoxysilane and γ-methacryloxypropyltrimethoxysilane, amino functional group-containing alkoxysilanes such as γ-aminopropyltriethoxysilane and 3-2-(aminoethylamino)propyltrimethoxysilane, epoxy functional group-containing alkoxysilanes such as γ-glycidoxypropyltrimethoxysilane and β-(3,4-epoxycyclohexyl)ethyltrimethoxysilane, or isocyanate functional group-containing alkoxysilanes. If adding these alkoxysilanes or silane coupling agents, they can be added in an amount of 0.1 to 20% by mass, particularly 0.1 to 10% by mass, with respect to the whole primer composition.

Examples of the above metal alkoxides include titanium alkoxides as typified by titanium tetraalkoxides such as titanium tetraethoxide, titanium tetraisopropoxide and titanium tetrabutoxide; and zirconium alkoxides as typified by zirconium tetraalkoxides such as zirconium tetrapropoxide, zirconium tetra-n-butoxide and zirconium tetra-tert-butoxide. If adding such metal alkoxide(s), it can be added in an amount of 0.1 to 20% by mass, particularly 0.1 to 10% by mass, with respect to the whole primer composition.

Further, in order to improve an adhesiveness between the SiH groups in the (meth)acryl copolymer (I) and an addition reaction-curable silicone composition, a platinum catalyst as a catalyst for addition reaction may also be added in an amount not impairing a stability of the composition of the present invention.

Moreover, as other optional components, a reinforcing filler, a dye, a colorant, a heat resistance improver and/or an antioxidant may also be added without impairing the purpose of the present invention.

Since the primer composition of the present invention contains the copolymer of the (meth)acrylate ester monomer having a favorable wettability to a polyolefin resin; and the (meth)acrylate ester monomer having a hydrosilyl group(s) capable of forming bonds with an addition-curable silicone resin, the primer composition, as a primer, can favorably bond a silicone resin and a polyolefin resin.

Method for Bonding Silicone Resin and Polyolefin Resin

As a method of the present invention for bonding a silicone resin and a polyolefin resin, there may be employed, for example, a method where the primer composition of the present invention is at first applied to the surface of a base material made of a polyolefin resin to form a primer composition layer thereon, followed by applying to an outer surface of such primer composition layer a silicone rubber composition selected from a room temperature condensation-curable silicone rubber composition and an addition-curable silicone rubber composition to form a silicone rubber composition layer, and then curing such silicone rubber composition layer to form a silicone resin layer comprised of a silicone rubber cured product, thereby bonding the silicone resin and the polyolefin resin.

The cured product of an addition-curable silicone rubber composition is obtained by curing an addition reaction-curable silicone composition containing at least a vinyl group-containing polyorganosiloxane, a polyorganohydrogensiloxane and a platinum catalyst, and is preferably a rubber-like elastic body. As other optional components, a reaction controlling agent, a coloring agent, a flame retardancy imparting agent, a heat resistance improver, a plasticizer, a reinforcing silica, an adhesin imparting agent and the like may be added to the silicone composition.

Method for Producing Primer Composition

The primer composition of the present invention can be produced by: preparing the (meth)acryl copolymer (I) by subjecting the (meth)acrylate ester monomer (A) represented by the general formula (3) and the hydrosilyl group (SiH group)-containing (meth)acrylate ester monomer (B) represented by the general formula (4) to random copolymerization at the abovementioned particular molar ratio in an appropriate solvent (preferably a solvent identical to the solvent (II)) by means of, for example, heating, and using a polymerization initiator; and then performing dilution to a predetermined concentration using the solvent (II).

WORKING EXAMPLES

While the present invention is described in detail hereunder with reference to working and comparative examples, the invention is not limited to these working examples. Here, an ordinary pressure means 1 atm; a room temperature means 25±5° C. Further, a molecular weight refers to a number average molecular weight in terms of polystyrene in a GPC analysis performed on each (co)polymer prepared under conditions similar to those in the working and comparative examples, using THF as a developing solvent.

Working Example 1

Under an ordinary pressure, 300 g of ethyl acetate, 75.7 g (0.45 mol) of cyclohexyl methacrylate, 19.0 g (0.05 mol) of [3-[tris(dimethylhydrogensiloxy)silyl]propyl] methacrylate and 0.6 g of 2,2'-azobis(2-methylbutyronitrile) (V-59 by Wako Pure Chemical Corporation) were put into a 2,000 mL separable flask, followed by heating and stirring them at 80° C. for six hours, thereby obtaining a solution containing 94.7 g of a copolymer (I) ((meth)acrylate ester monomer unit (A): (meth)acrylate ester monomer unit (B)=90:10 (molar ratio), sequence of monomer unit (A) and monomer unit (B) is random, molecular weight: about 50,000). After cooling such solution containing the copolymer (I), 1,200 g of ethyl acetate was used to dilute the solution, thus obtaining a primer 1.

Working Example 2

A solution containing 77.6 g of a copolymer (I) ((meth) acrylate ester monomer unit (A): (meth)acrylate ester monomer unit (B)=99:1 (molar ratio), sequence of monomer unit (A) and monomer unit (B) is random, molecular weight: about 40,000) was obtained in a similar manner as the working example 1, except that 1.9 g (0.005 mol) of [3-[tris(dimethylhydrogensiloxy)silyl]propyl] methacrylate was used instead of 19.0 g (0.05 mol) of [3-[tris(dimethylhydrogensiloxy)silyl]propyl] methacrylate. After cooling such solution containing the copolymer (I), 1,200 g of ethyl acetate was used to dilute the solution, thus obtaining a primer 2.

Working Example 3

A solution containing 83.0 g of a copolymer (I) ((meth) acrylate ester monomer unit (A): (meth)acrylate ester monomer unit (B)=90:10 (molar ratio), sequence of monomer unit (A) and monomer unit (B) is random, molecular weight: about 50,000) was obtained in a similar manner as the working example 1, except that 64.0 g (0.45 mol) of tert-butyl methacrylate was used instead of 75.7 g (0.45 mol) of cyclohexyl methacrylate. After cooling such solution containing the copolymer (I), 1,200 g of ethyl acetate was used to dilute the solution, thus obtaining a primer 3.

Comparative Example 1

A solution containing 75.7 g of a homopolymer of cyclohexyl methacrylate (molecular weight: about 40,000) was obtained in a similar manner as the working example 1, except that [3-[tris(dimethylhydrogensiloxy)silyl]propyl] methacrylate was not added. After cooling such solution containing the homopolymer, 1,200 g of ethyl acetate was used to dilute the solution, thus obtaining a primer 4.

Comparative Example 2

A solution containing 88.1 g of a random copolymer (cyclohexyl methacrylate: [3-(trimethoxysilyl)propyl] methacrylate=90:10 (molar ratio), molecular weight: about 50,000) was obtained in a similar manner as the working example 1, except that 12.4 g (0.05 mol) of [3-(trimethoxysilyl)propyl] methacrylate was used instead of [3-[tris (dimethylhydrogensiloxy)silyl]propyl] methacrylate. After cooling such solution containing the random copolymer, 1,200 g of ethyl acetate was used to dilute the solution, thus obtaining a primer 5.

Test Condition

Each of the primers 1 to 5 prepared in the working and comparative examples was thinly applied by a brush to the surfaces of two pieces of polypropylene resin-made adherends each having a width of 25 mm and a length of 100 mm. An addition-curable silicone rubber composition (KE-1825 by Shin-Etsu Chemical Co., Ltd.) was then applied between the two pieces of the adherends with the primer-coated surfaces facing each other inward, in a manner such that the composition applied therebetween would have a thickness of 1 mm. Next, heat curing was performed at 120° C. for an hour to obtain a shear adhesion test specimen having a silicone rubber cured product layer (thickness 1 mm) formed on the two pieces of the polypropylene resin-made adherends via the primer layers, an adhesion area 2.5 cm² (width 25 mm×length 10 mm) and an adhesion thickness of 1 mm.

A shear adhesion force and a cohesive failure rate of each test specimen was measured in accordance with JIS K-6249 (shear adhesion test) immediately after the test specimen was produced as above, where test specimens exhibiting a cohesive failure rate of not lower than 80% (80 to 100%) were given "○," test specimens exhibiting a cohesive failure rate of 50 to 79% were given "Δ," and test specimens exhibiting a cohesive failure rate of not higher than 49% were given "x."

TABLE 1

| | | | Working example 1 | Working example 2 | Working example 3 | Comparative example 1 | Comparative example 2 |
|---|---|---|---|---|---|---|---|
| (I) | A | Cyclohexyl methacrylate | 75.7 | 75.7 | | 75.7 | 75.7 |
| | | Tert-butyl methacrylate | | | 64.0 | | |
| | B | [3-[tris(dimethylhydrogensiloxy)silyl]propyl] methacrylate | 19.0 | 1.9 | 19.0 | | |
| | | [3-(trimethoxysilyl)propyl] methacrylate | | | | | 12.4 |
| (II) | | Ethyl acetate | 1500 | 1500 | 1500 | 1500 | 1500 |
| Shear adhesion test result | | Adhesiveness to polypropylene resin | ○ | ○ | ○ | x | x |

As shown in Table 1, the primers of the working examples 1 to 3 each containing the copolymer (I) comprised of the monomer unit represented by the general formula (1) and the monomer unit represented by the general formula (2), exhibited an extremely favorable adhesiveness to the polypropylene resin as compared to the comparative examples 1 and 2.

Based on the above results, it can be concluded that a silicone rubber cured product (silicone resin) and a polyolefin resin can be favorably bonded together by employing a copolymer comprised of the particular (meth)acrylate ester monomer unit (A) and the (meth)acrylate ester monomer unit (B) having a hydrosilyl group(s) capable of forming bonds with an addition-curable silicone resin or the like.

Here, the present invention is not limited to the above embodiments. The embodiments described above are merely examples; any embodiment having a structure substantially identical to, and exhibiting functions and effects similar to those of the technical idea(s) as set forth in the claims of the present invention shall be included in the technical scope of the present invention.

The invention claimed is:

1. A primer composition for bonding a cured product of a room temperature condensation-curable silicone rubber composition or an addition-curable silicone rubber composition and a base material made of a polyolefin resin, comprising a copolymer (I) contained in a solvent (II), wherein the copolymer (I) comprises:

a (meth)acrylate ester monomer unit (A) represented by the following general formula (1)

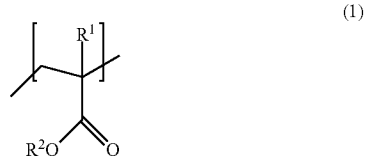

wherein $R^1$ represents a hydrogen atom or a methyl group, and $R^2$ represents a tert-butyl group or a cyclohexyl group; and a (meth)acrylate ester monomer unit (B) represented by the following general formula (2)

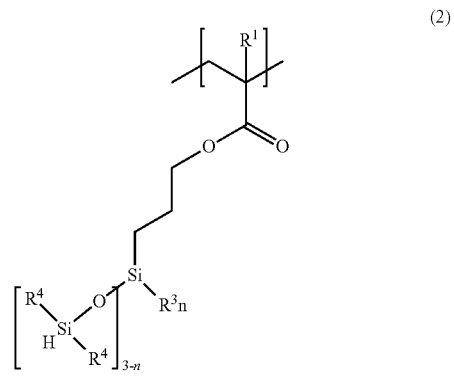

wherein $R^1$ represents a hydrogen atom or a methyl group, $R^3$ represents a hydrogen atom, or a substituted or unsubstituted monovalent hydrocarbon group having 1 to 12 carbon atoms, each $R^4$ independently represents a substituted or unsubstituted monovalent hydrocarbon group having 1 to 12 carbon atoms, and n represents an integer satisfying $0 \leq n \leq 2$.

2. The primer composition for bonding a silicone resin and a polyolefin resin according to claim 1, wherein a molar ratio of (meth)acrylate ester monomer unit (A):(meth)acrylate ester monomer unit (B) in the copolymer (I) is 1:1 to 1,000:1.

3. The primer composition for bonding a silicone resin and a polyolefin resin according to claim 1, wherein the copolymer (I) is present in an amount of 0.1 to 20 parts by mass per 100 parts by mass of the solvent (II).

4. The primer composition for bonding a silicone resin and a polyolefin resin according to claim 1, wherein the solvent (II) is at least one selected from the group consisting of an aromatic hydrocarbon solvent, an alcohol solvent, a ketone solvent, an ether solvent, an ester solvent and a paraffin solvent.

5. The primer composition for bonding a silicone resin and a polyolefin resin according to claim 1, wherein a number average molecular weight of the copolymer (I) is 3,000 to 200,000.

6. The primer composition for bonding a silicone resin and a polyolefin resin according to claim 1, wherein the copolymer (I) consists of, as monomer units, the (meth) acrylate ester monomer unit (A) and the (meth)acrylate ester monomer unit (B).

7. A method for bonding a silicone resin and a polyolefin resin, the method comprising:
- applying the primer composition according to claim 1 to a surface of a base material made of a polyolefin resin to form a primer composition layer thereon;
- applying to an outer surface of the primer composition layer a silicone rubber composition selected from a room temperature condensation-curable silicone rubber composition and an addition-curable silicone rubber composition to form a silicone rubber composition layer; and
- curing the silicone rubber composition layer to form a silicone resin layer comprised of a silicone rubber cured product.

* * * * *